(12) United States Patent
Rosenberg et al.

(10) Patent No.: US 10,375,125 B2
(45) Date of Patent: Aug. 6, 2019

(54) AUTOMATICALLY JOINING DEVICES TO A VIDEO CONFERENCE

(71) Applicant: Cisco Technology, Inc., San Jose, CA (US)

(72) Inventors: Jonathan Rosenberg, Freehold, NJ (US); Amit Barave, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/499,595

(22) Filed: Apr. 27, 2017

(65) Prior Publication Data
US 2018/0316893 A1 Nov. 1, 2018

(51) Int. Cl.
*H04N 7/14* (2006.01)
*H04N 7/15* (2006.01)
*H04L 29/06* (2006.01)

(52) U.S. Cl.
CPC ...... *H04L 65/1069* (2013.01); *H04L 65/1093* (2013.01); *H04L 65/403* (2013.01); *H04N 7/152* (2013.01); *H04N 2007/145* (2013.01)

(58) Field of Classification Search
CPC combination set(s) only.
See application file for complete search history.

(56) References Cited

U.S. PATENT DOCUMENTS

| | | |
|---|---|---|
| 4,460,807 A | 7/1984 | Kerr et al. |
| 4,890,257 A | 12/1989 | Anthias et al. |

(Continued)

FOREIGN PATENT DOCUMENTS

| | | |
|---|---|---|
| CN | 101055561 | 10/2007 |
| CN | 101076060 | 11/2007 |

(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

(Continued)

*Primary Examiner* — Phung-Hoang J Nguyen
(74) *Attorney, Agent, or Firm* — Polsinelli PC

(57) ABSTRACT

The present technology allow for a user's portable device to automatically join a videoconference without any action by a user. A collaboration service can be aware of portable devices in a conference room that is an endpoint for a video conference, and learn of identities associated with the portable devices present in the conference room. After the video conference is initiated in the conference room, all devices that are in communication with the collaboration service can also be automatically joined to the conference. Since all conference participants in the conference room have their own portable device that is joined to the conference the portable devices in the conference room act as a second screen available to the video conference. As such video from the conference can be directed to a common conference room display, while conference materials can be displayed separately on the portable devices. Additionally, each conference participant's identity can be added to a conference participant roster automatically.

19 Claims, 9 Drawing Sheets

(56) References Cited

U.S. PATENT DOCUMENTS

| | | |
|---|---|---|
| 4,977,605 A | 12/1990 | Fardeau et al. |
| 5,293,430 A | 3/1994 | Shiau et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,811,586 B2 * | 8/2014 | Ali-Vehmas ............ H04W 4/16 379/202.01 |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,762,709 B1 | 9/2017 | Snyder et al. |
| 2001/0030661 A1 | 10/2001 | Reichardt |
| 2002/0018051 A1 | 2/2002 | Singh |
| 2002/0076003 A1 | 6/2002 | Zellner et al. |

(56) References Cited

U.S. PATENT DOCUMENTS

| | | |
|---|---|---|
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1* | 1/2005 | Desai ............... H04L 51/24 455/416 |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0153168 A1* | 7/2006 | Saksena ............ H04L 29/06027 370/352 |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2006/0293073 A1* | 12/2006 | Rengaraju ......... H04L 29/06027 455/518 |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1* | 4/2010 | Badros ................ G06Q 30/02 707/725 |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1* | 3/2011 | Dreher ................ H04M 3/436 379/202.01 |
| 2011/0087745 A1 | 4/2011 | O'Sullivan et al. |
| 2011/0117535 A1 | 5/2011 | Benko et al. |
| 2011/0131498 A1* | 6/2011 | Chao ................... H04N 7/15 715/723 |
| 2011/0154427 A1 | 6/2011 | Wei |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1* | 9/2012 | Carr ................... H04L 12/1818 709/204 |
| 2012/0246596 A1 | 9/2012 | Ording et al. |
| 2012/0284635 A1 | 11/2012 | Sitrick et al. |
| 2012/0296957 A1 | 11/2012 | Stinson et al. |

(56) References Cited

U.S. PATENT DOCUMENTS

| | | |
|---|---|---|
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1* | 8/2013 | Tandon .................. H04M 3/567 715/716 |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1* | 9/2013 | Tian .................... H04L 12/1822 370/352 |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0351327 A1 | 11/2014 | Huang et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1* | 3/2016 | Priya ..................... H04L 65/403 709/204 |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0321347 A1 | 11/2016 | Zhou et al. |
| 2016/0337616 A1* | 11/2016 | Liu ........................ H04N 7/157 |
| 2017/0006162 A1 | 1/2017 | Bargetzi et al. |
| 2017/0006446 A1* | 1/2017 | Harris ..................... H04W 4/206 |
| 2017/0070706 A1* | 3/2017 | Ursin ...................... H04N 7/157 |
| 2017/0093874 A1 | 3/2017 | Uthe |
| 2017/0104961 A1* | 4/2017 | Pan ........................ H04N 7/152 |
| 2017/0171260 A1 | 6/2017 | Jerrard-Dunne et al. |
| 2017/0324850 A1 | 11/2017 | Snyder et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |

(56) References Cited

FOREIGN PATENT DOCUMENTS

| WO | WO 2008/139269 | 11/2008 |
|---|---|---|
| WO | WO 2012/167262 | 12/2012 |
| WO | WO 2014/118736 | 8/2014 |

OTHER PUBLICATIONS

Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).
InFocus, "Mondopad," Mondopad. http://www.infocus.com/sites/default/files/InFocus-Mondopad-INF5520a-INF7021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
NU-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-uc-board-_datasheet.pdf, (last accessed Oct. 11, 2013).
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
TNO, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).
Author Unknown, ""I can see the future" 10 predictions concerning cell-phones," Surveillance Camera Players, http://www.notbored.org/cell-phones.html, Jun. 21, 2003, 2 pages.
Author Unknown, "Manage Meeting Rooms in Real Time," Jan. 23, 2017, door-tablet.com, 7 pages.
Stevenson, Nancy, "Webex Web Meetings for Dummies" 2005, Wiley Publishing Inc., Indianapolis, Indiana, USA, 339 pages.
Choi, Jae Young, et al; "Towards an Automatic Face Indexing System for Actor-based Video Services in an IPTV Environment," IEEE Transactions on 56, No. 1 (2010): 147-155.
Cisco Systems, Inc. "Cisco webex: WebEx Meeting Center User Guide for Hosts, Presenters, and Participants" © 1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.
Nyamgondalu, Nagendra, "Lotus Notes Calendar and Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee Is Driving", May 20, 2013, 13 pages.

\* cited by examiner

AUTOMATICALLY JOINING DEVICES TO A VIDEO CONFERENCE

TECHNICAL FIELD

The present disclosure pertains to joining users to a conference and more specifically to automatically joining users within a conference room to a conference.

BACKGROUND

Video conferencing has become a prevalent mechanism for conducting conferences. While videoconferencing can provide a better conference experience than an audio only teleconference, videoconferencing still has several areas which could be improved. For example when a large conference room is an endpoint for a videoconference it can be very difficult to get all conference participants in one frame, and even if all conference participants can be captured in one frame, it can often be difficult to recognize a person in the frame. This makes it so conference participants not in the large conference room often may be unaware of the identity of all the conference participants in that conference room.

Another challenge present in videoconferences occurs when there is a lot of visual material to be shared with conference endpoints. For example a conference room display may be able to effectively display a video of a speaker, or display shared conference materials such as a presentation, but when the conference room display presents both video of a speaker and shared conference materials at the same time neither the video nor the conference materials are easily viewed by conference participants. This could be because the room is large and the size of fonts in the materials make it difficult to read for participants towards the back of the room.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
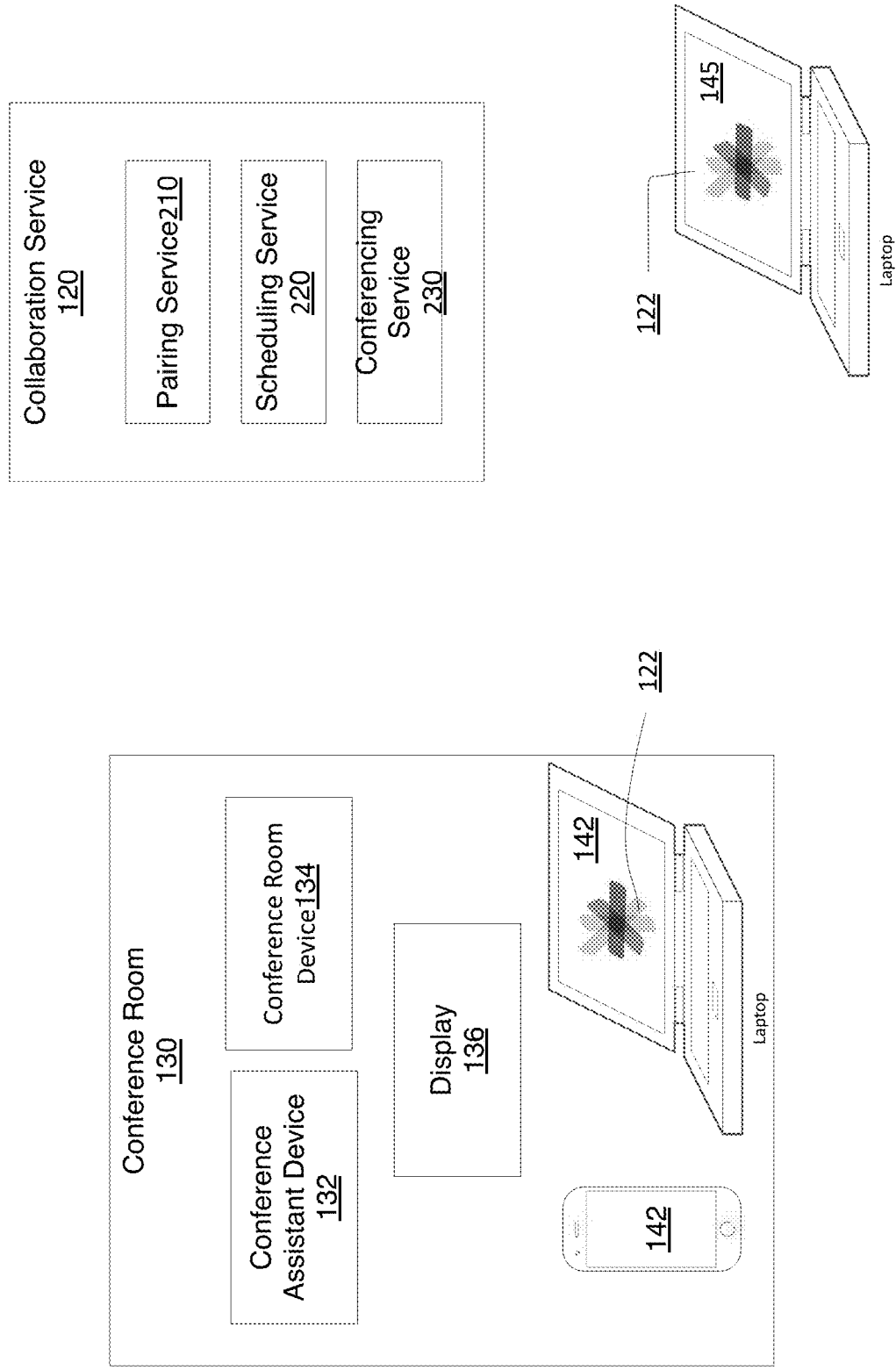
FIG. 1 is a conceptual block diagram illustrating an example network environment for providing conferencing capabilities, in accordance with various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology improves limitations of traditional videoconferencing systems. Depending on the number of participants in a videoconference, and the location of those participants it can be difficult to know the identity of all of the conference participants. For example when conference participants are gathered in a large conference room, it can be difficult to make out the identity were to recognize the conference participants in the video of that conference room. Further, when conference materials are presented in a videoconference on a common display along with video feeds from cameras in conference rooms joined to the videoconference it can be difficult to make out the content of the conference materials and the video feed may also become difficult to clearly see.

The present technology can ameliorate these problems by making use of portable devices brought to the conference by conference participants. For example if a conference participant were to join their portable device to the conferencing service, conference participant would be open to view conference materials on their portable device. However, asking a conference participant to take the steps required to manipulate their portable device to join a conference provides a barrier to entry so great that many conference participants will not take such steps. As such the present technology can automatically join the conference participants portable device to a conference without any action taken by the user of the portable device.

While some embodiments of the present technology allow for a user's portable device to automatically join a videoconference without any action by a user, the present disclosure acknowledges that such a use case might not be desirable to the user. As such the present technology expressly contemplates that commercial implementations of technology described herein may be implemented with prompts to receive approval from users of portable devices before taking actions or may be implemented user configurable options and user consent to allow for fully automatic joining of videoconferences by portable devices. Therefore while the present technology may be described herein in terms of automatic functions that do not require user input commercial embodiments may in fact request user input to provide a better user experience.

The present technology provides for a collaboration service that can be aware of relevant devices in a specific conference room that is an endpoint for a video conference. For example the collaboration service can be aware of the video conferencing endpoint in the conference room, and can learn the identifiers of any portable devices present in the conference room. The collaboration service can also learn of identities (e.g., user identities, user names, account identities, etc.) associated with the portable devices present in the conference room. In some embodiments, collaboration service learns of the identifiers of the portable devices, and the associated identities from an application running on the portable devices that is configured to automatically communicate with the collaboration services when the application detects that the portable device is in the conference room.

The videoconference can be launched by any device in the conference room that is in communication with the collaboration service. These devices can include the video conferencing endpoint (i.e., conference room device), any of the portable devices, or a conference room assistant device (that can receive spoken requests and take actions).

Once the video conference is launched in the conference room by any device in the conference room that is in communication with the collaboration service, all other devices that are in communication with the collaboration service can also be automatically joined to the conference. Alternatively, only devices that are both in communication with the collaboration service, and that are associated with an identity that has been invited, or otherwise has access privileges to be present in the conference can be automatically joined. In such embodiments, portable devices that are in communication with the collaboration service, but not invited to the conference may ask to gain permission to be added to the video conference.

In some embodiments, it may be assumed that all conference participants in the conference room have their own portable device that is joined to the conference. Such assumption allows to make use of the portable devices in the conference room as a second screen available to the video conference. As such video from the conference can be directed to a common conference room display, while conference materials can be displayed separately on the portable devices. In such embodiments, the portable devices might be joined to the conference in a limited mode, wherein at least audio is not sent to the portable devices to avoid sound feedback loops.

Since each participant is automatically joined to the conference using their portable device, and since the collaboration service is aware of an identity associated with the portable device, each conference participants identity can be added to a conference participant roster automatically.

DETAILED DESCRIPTION

FIG. 1 is a conceptual block diagram illustrating an example environment for providing conferencing capabilities, in accordance with various embodiments of the subject technology.

FIG. 1 illustrates collaboration service 120 that is in communication with devices from one or more geographic locations. In FIG. 1, conference room 130 is in one such geographic location. Client device 145 can be in another geographic location, or at least not in conference room 130.

Conference room 130 includes a conference room device 134, and a display 136. Display 136 may be a monitor, a television, a projector, a tablet screen, or other visual device that may be used during the conferencing session. Conference room device 134 is configured to provide a user interface to receive and relay commands to interact with collaboration service 120 to launch or control conferencing functions. In some embodiments, conference room device 134 is configured to interface with display 136 and provide the conferencing session input for display 136. Conference room device 134 may be integrated into display 136 or separate from display 136 and communicate with display 136 via a Universal Serial Bus (USB) interface, a High-Definition Multimedia Interface (HDMI) interface, a computer display standard interface (e.g., Video Graphics Array (VGA), Extended Graphics Array (XGA), etc.), a wireless interface (e.g., Wi-Fi, infrared, Bluetooth, etc.), or other input or communication medium. While not illustrated conference room 130 can include at least one audio device which may include one or more speakers, microphones, or other audio equipment that may be used during the conferencing session that can be controlled by conference room device 134.

In some embodiments conference room 130 can also include conference assistant device 132 that is assigned to conference room 130. Conference assistant device 132 is configured to provide assistance with conferencing functions through use of artificial intelligence. For example conference assistant device 132 can operate as robot that can receive voice commands to start a conference or otherwise interact with collaboration service 120 on behalf of conference participants in conference room 130. For example, a user may enter a room and say "Please start my conference." The conference assistant device may receive the instructions via a microphone and transmit the instructions to the collaboration service 120. The collaboration service 120 may convert the speech to text using speech-to-text functionality or third-party service. The collaboration service 120 may use natural language processing to determine the user's intent to start a conference, identify an appropriate calendar entry for the user or conference room, and start the conference associated with the calendar entry. In some cases, collaboration service 120 may further use text-to-speech functionality or service to provide responses back to the user via the conference assistant device. Conference assistant device 132 may be a separate physical device from conference room device 134, or may merely represent software functionality implemented on conference room device 134 along with collaboration service 120.

Either or both of conference assistant device 132 or conference room device 134 is configured to pair with portable computing devices 142. In some embodiments this is achieved by conference assistant device 132 and/or conference room device 134 emitting ultrasonic sound waves (e.g., at frequencies in the ultrasonic range that are beyond the range of human hearing). In some embodiments, the sound waves may be encoded with information such as a current time and a location identifier. The location identifier may be, for example, conference assistant device 132 identifier, conference room 130 identifier, or a random number that varies over time etc. The ultrasonic sound waves encoded with information may be considered an ultrasonic token or series of tokens, the knowledge of which represents a proof of presence in that conference room 130.

Portable device 142 may detect the ultrasonic token or tokens, and inform collaboration pairing service 210 that portable device 142 detected the ultrasonic token or tokens from the conference assistant device 132 or conference room device 134. In order to take action on the detected ultrasonic token, portable device 142 must have collaboration application 122 running. In some embodiments, collaboration pairing service 210 may check that the ultrasonic token or tokens are valid and correspond to ones emitted by a current conference room device within a recent time period. If portable device 142 received the ultrasonic token at the appropriate time and having the correct number, collaboration pairing service confirms that portable device 142 is in conference room 130, and the collaboration pairing service 210 may pair portable device 142, and conference assistant device 132 and/or conference room device 134. In some embodiments, pairing service 210 can coordinate direct pairing between portable device 142 and conference assistant device 132 and/or conference room device 134 such that the devices can communicate directly with each other. In some embodiments, pairing service 210 provides for indirect pairing between portable device 142 and conference assistant device 132 and/or conference room device 134 wherein communications between portable device 142 and conference assistant device 132 and/or conference room device 134 are passed through collaboration service 120.

As long as collaboration application 122 is running on portable device 142, pairing can occur without any interaction from a user of portable device 142. Though, in some embodiments, application 122 may request confirmation from the user before such action is taken.

In some embodiments, conference assistant device 132 and portable device 142 may pair together directly, without the assistance of collaboration pairing service 210. Furthermore, in some embodiments, the roles are reversed where portable device 142 emits high frequency sound waves and an ultrasonic sensor of conference assistant device 132 detects the high frequency sound waves from portable device 142.

In some embodiments, conference room 130 might have either conference assistant device 132 or conference room device 134. In embodiments where only one or the other exists, core functions of both devices can be integrated into one device. These core functions include: detecting the presence of portable devices 142, pairing with portable devices 142, and joining conference room 130 into a conference.

In some embodiments, other technologies can be used to establish pairing. These include Bluetooth or Bluetooth low energy (BLE), facial recognition, or other techniques which can, through a combination of software on the portable device 122, software on the conference room 134 or 132, and cloud service 120, work together to establish the fact that one or more user identities are present in conference room 130.

Portable devices 142 may have an operating system and run collaboration application 122 that is configured to interface with the collaboration service 120 or conference assistant device 132 in facilitating a conferencing session for a user. In some embodiments, collaboration application 122 can detect the presence of conference assistant 132 or conference room device 134 (through ultrasonic token described above), and using information learned from the ultrasonic token, pair with these devices. In some embodiments, whether or not collaboration application 122 is paired with conference assistant 132 or conference room device 134, collaboration application 122 also provides an interface effective for interacting with or controlling functions of collaboration service 120. In some embodiments collaboration application can be third-party application and interacts with collaboration service 120 via available API.

Scheduling service 220 is configured to identify an appropriate conference to start based on the paired devices, and can be used to determine if an identity associated with the paired devices can be admitted to a conference. As will be discussed in further detail below, scheduling service 220 may identify an identity associated with portable device 142 in a particular conference room. Scheduling service 220 may access an electronic calendar for conference room 130, an electronic calendar for the portable device 142, or both to perform its functions. An electronic calendar may include a schedule or series of entries for the user, a conference assistant device, a conference room, or any other resource associated with a conference. Each entry may signify a conference or collaboration session and include a date and time, a list of one or more participants, a list of zero or more locations, or a list of one or more conference resources. The electronic calendar may be stored by the scheduling service 220 or a third party service and accessed by scheduling service 220.

Figure 2:
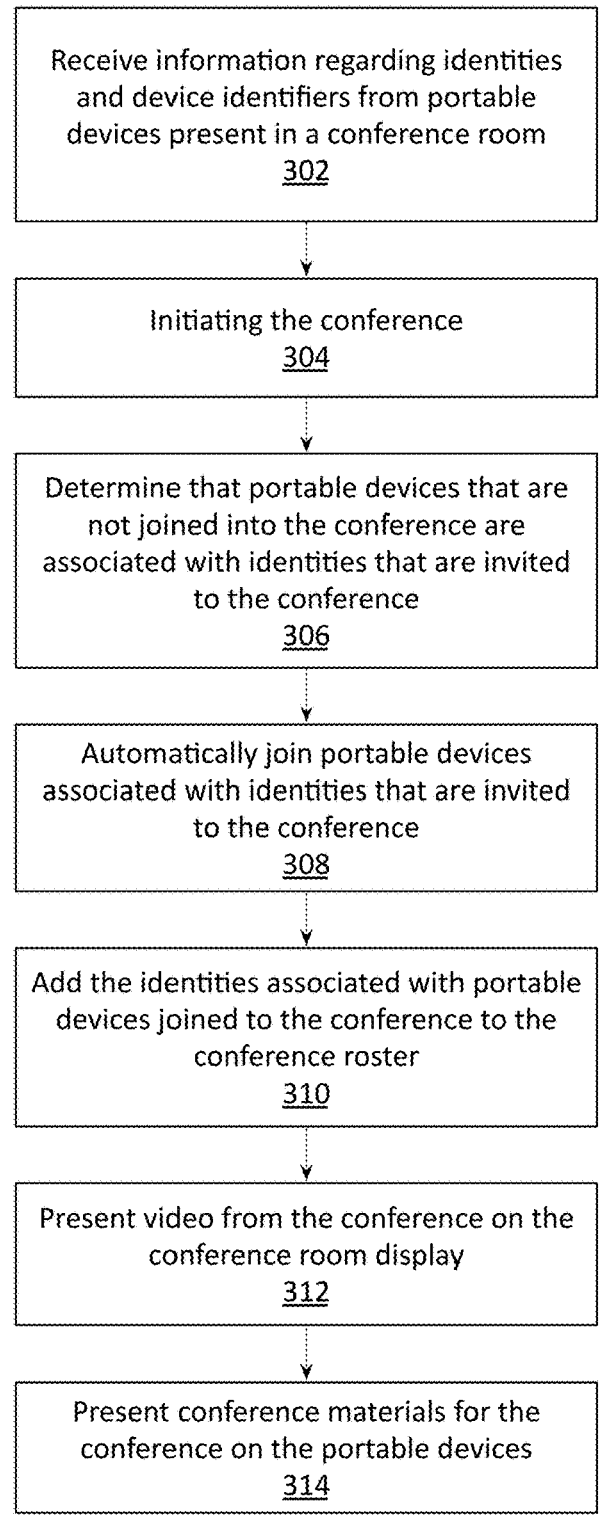
FIG. 2 is an example method, in accordance with various embodiments.

Conferencing service 230 is configured to start and manage a conferencing session between two or more devices (e.g., display 136, portable device(s) 142, portable devices 145, etc.), and is responsible for directing conference content (audio, video, screen share and other information) to the participants and devices in the conference FIG. 2 illustrates an example general method for automatically joining conference participants to a conference according to the present technology. As illustrated in FIG. 2, collaboration service 120 receives (302) information regarding identities and device identifiers associated with portable devices 142 present in conference room 130. Meanwhile collaboration service can initiate (304) the conference in response to receiving a command to do so, said conference now taking place on device 134 in conference room 130.

Collaboration service 120 can determine (306) that at least one portable device 142 in the conference room is not joined into the conference taking place on device 134, and determine (306) that an identity associated with the at least one portal device 142 in the conference room that is not joined into the conference is invited to the conference. In response to such determinations (306) collaboration service 120 can automatically join (308) those portal devices 142 into the conference. In some embodiments, portable device 142 does not need to be paired to conference room device 134 to be automatically joined into the conference. As long as collaboration service can determine that portable device 142 is in conference room 130, and that an identity associated with portable device 142 belongs in the conference, collaboration service 120 can automatically join portable device 142 into the conference.

In addition to automatically joining (308) portable devices 142 into the conference, collaboration service 120 can add (310) the identities associated with the portable devices 142 to a conference roster of the conference. Conference service 230 presents (312) video from the conference on conference room display 136. Conference service 230 further interacts with collaboration application 142 to present (314) materials for the conference on the portable devices.

Figure 3A:
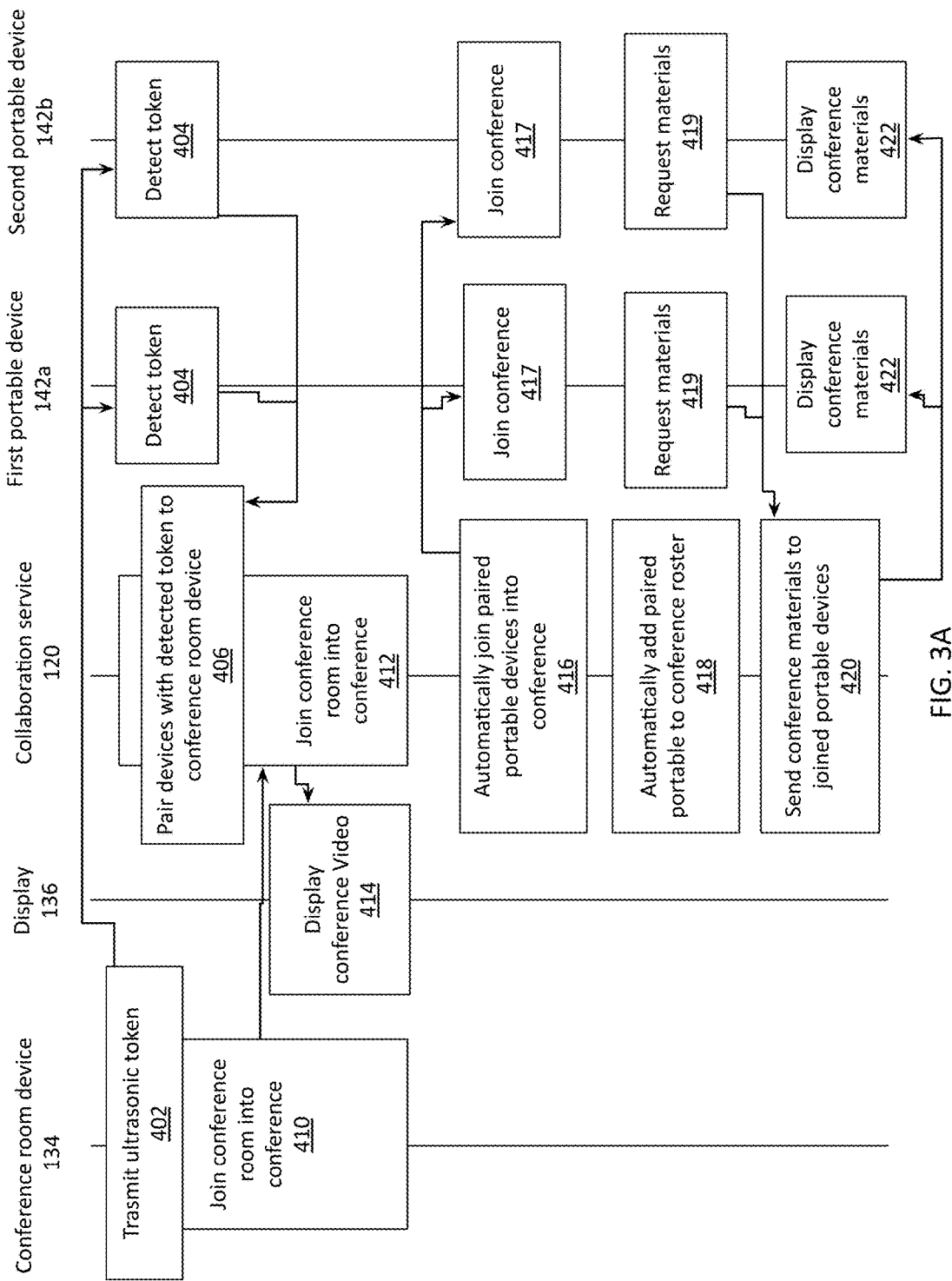
FIG. 3A and FIG. 3B illustrate example methods, in accordance with various embodiments.

FIG. 3A illustrates an example embodiment for automatically joining conference participants to a conference. In some embodiments, in order to join conference participants to the conference they must have a portable device 142 running collaboration application 122. Within conference room 130, conference room device 134 can transmit an ultrasonic token or tokens (402). Any device running collaboration application 122 can interpret the transmitted ultrasonic token or tokens. As illustrated in FIG. 3A first portable device 142A, and second portable device 142B have collaboration application 122 and can detect (404) the ultrasonic token transmitted by conference room device 134. After detecting (404) the ultrasonic token, portable devices 142 can communicate with pairing service 210 of collaboration service 120 to request to be paired with conference room device 134. Communication from the portable devices 142 to pairing service 210 includes information extracted from the transmitted ultrasonic token or tokens. Based on information from the transmitted ultrasonic tokens, pairing service 210 can pair (406) portable devices 142 to conference room device 134.

Prior to, after, or concurrent with the pairing of portable devices 142 with conference room device 134, conference room device 134 can be used to join (410) conference room 130 into the conference. This can be accomplished by a conference participant interacting with conference room device 134, and conference room device 134 communicating with collaboration service 120 to join (412) conference room 130 into the conference. Once conference room 130 is joined into the conference conferencing service 230 can send video of the conference to display 136 for display (414).

In some embodiments, once joined to the conference, conference room 130 is configured to request content from conferencing service 230. For example, if no portable devices are simultaneously paired with conference room device 134 or pairing service 210, the conference room device 134 will request all available content including video, and conference materials, and audio. However, consistent with some embodiments of the present technology, when conference room device 134 is aware that one or more portable device 142 are present in conference room 130, conference room device might only request video and audio from conferencing service 230, and leave portable devices 142 to request conference materials as described below. Alternatively, it might always render content regardless of the portable devices in the room.

After conference room 130 is joined to the conference and portable devices 142 are paired with conference room device 134, it is then possible to automatically link portable devices 142 with associated identities into the conference. This can be accomplished by collaboration service 120 which is aware of portable devices 142 in conference room 130, and is also aware of identities associated with portable devices 142 from information acquired during pairing (406). For example during the pairing process collaboration application 122 can communicate the user identifier or other credentials to identify a user associated with portable device 142.

Figure 4:
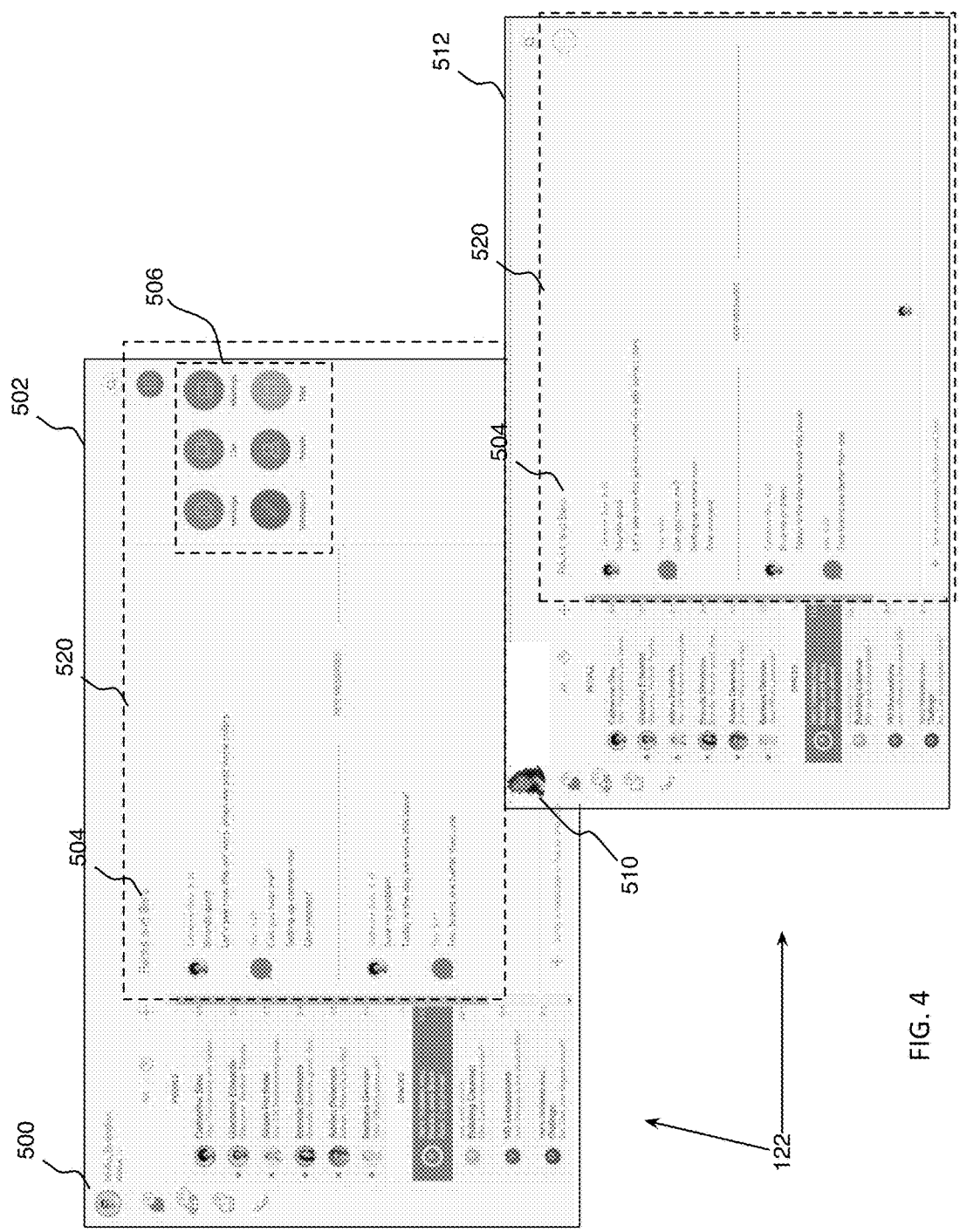
FIG. 4 illustrates an example display of a collaboration application according to some embodiments.

Using user identifier or other credentials scheduling service 220 can determine that identity should be automatically joined to the conference. This can be accomplished by determining that the identity associated with portable device 142 is present on an electronic conference invitation (such as a calendar invitation). In some embodiments the conference invitation will also include conference room 130 in the invitation. In some embodiments, such as when the conference was started ad hoc, without prior scheduling, scheduling service 220 can determine the conference was launched from a collaborative space and that the identity associated with portable device 142 is therefore temporarily associated with that collaborative space while the conference is in progress. For example, FIG. 4 illustrates a screen display 502 from a first client device and a screen display 512 from a second client device. Screen displays 502, 512 illustrate a collaborative space 504 (called "Racks and Bars") to which identity 500 and identity 510 are both associated. A user having identity 500 operating client device displaying screen display 502 can initiate a conference directly from collaborative space 504 by selecting user interface feature 506.

After confirming that the identity associated with portable device 142 that is in conference room 130 is invited to the conference, conferencing service 130 can automatically join (416) paired portable devices into a conference by communicating with collaboration application 122 on portable devices 142 to accept an invitation to join the conference. Portable devices 142 can accept the invitation and join (417) the conference. Alternatively, pairing service can inform portable devices that they are present in the room, and those devices can request to join the conference.

Figure 6:
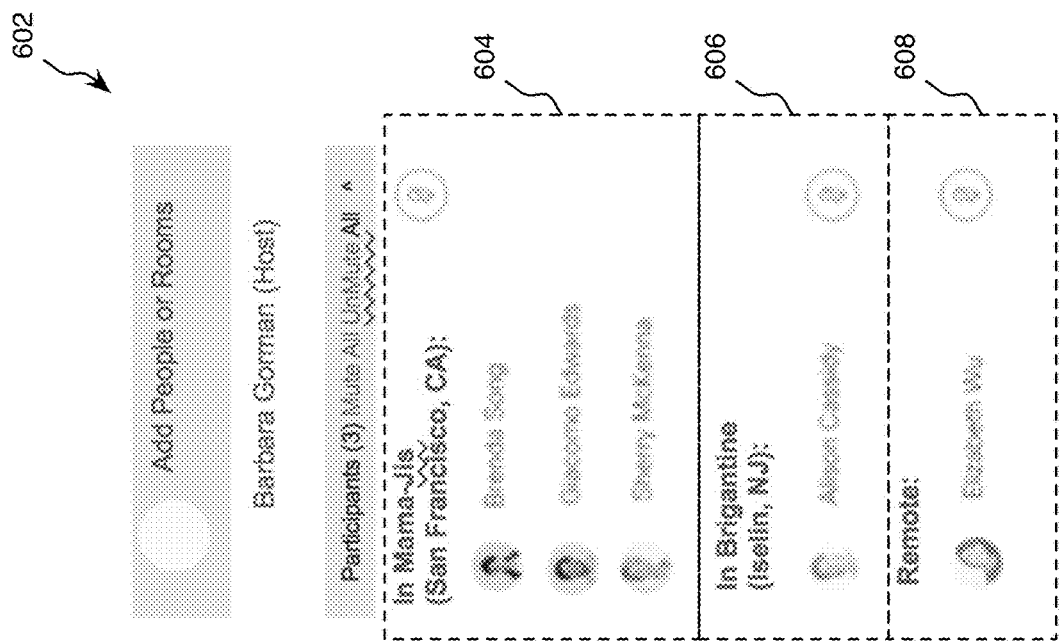
FIG. 6 illustrates an example conference roster according to some embodiments.

Once portable devices 142 are joined into the conference, the identities associated with portable devices 142 can be automatically added (418) to a conference attendance roster as illustrated in FIG. 6.

When portable device 142 join the conference using collaboration application 122, it can request to received only limited feeds from conferencing service 230. Since application 122 is aware that it is paired to pairing service 210 and conference room device 134, application 122 is aware that portable device 142 is in conference room 130. As such, it should not request an audio feed because playing the audio would result in a feedback loop with the audio equipment in conference room 130. Application 122 requests (419) conference materials.

Figure 5:
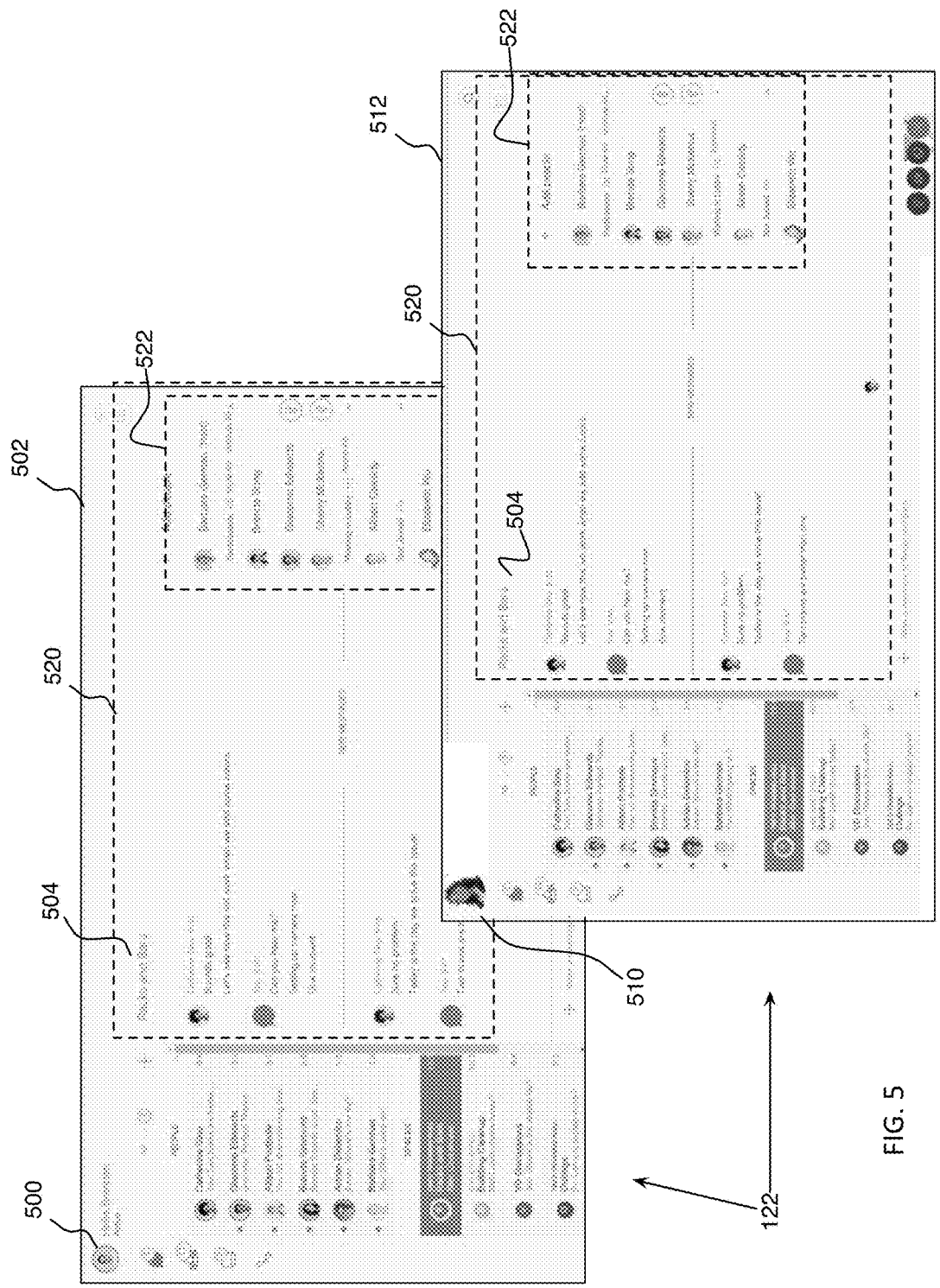
FIG. 5 illustrates an example display of a collaboration application according to some embodiments.

Conferencing service 230 can send (420) any conference materials to joined portable devices so that portable devices 142 can display (422) conference materials. In such embodiments video from the conference can be displayed (414) on display 136 while conference materials can be displayed (422) on portable devices 142. Video from the conference can include video feeds of conference participants, while conference materials can include screen shares, presentations, shared spaces, conference attendance rosters, whiteboards, etc. For example FIG. 5, illustrates conference materials 520 displayed by collaboration application 122 on portable devices display 502 and display 512, each being displayed on respective portable devices 142. Both display 502 and 512 display common conference materials 520, which include collaborative space 504 and conference roster 522.

In some embodiments wherein multiple portable devices 142 are present in conference room 130 and have requested conference materials from conferencing service 230, conferencing service 230 can send the materials to each of portable device 142 directly over a networked connection. While in some embodiments, conferencing service 230 can send conference materials to conference room device which can broadcast the conference materials to all portable devices 142 in conference room 130. Such embodiments can provide a more efficient use of bandwidth and better synchronize the experiences of multiple portable devices 142.

Figure 3B:
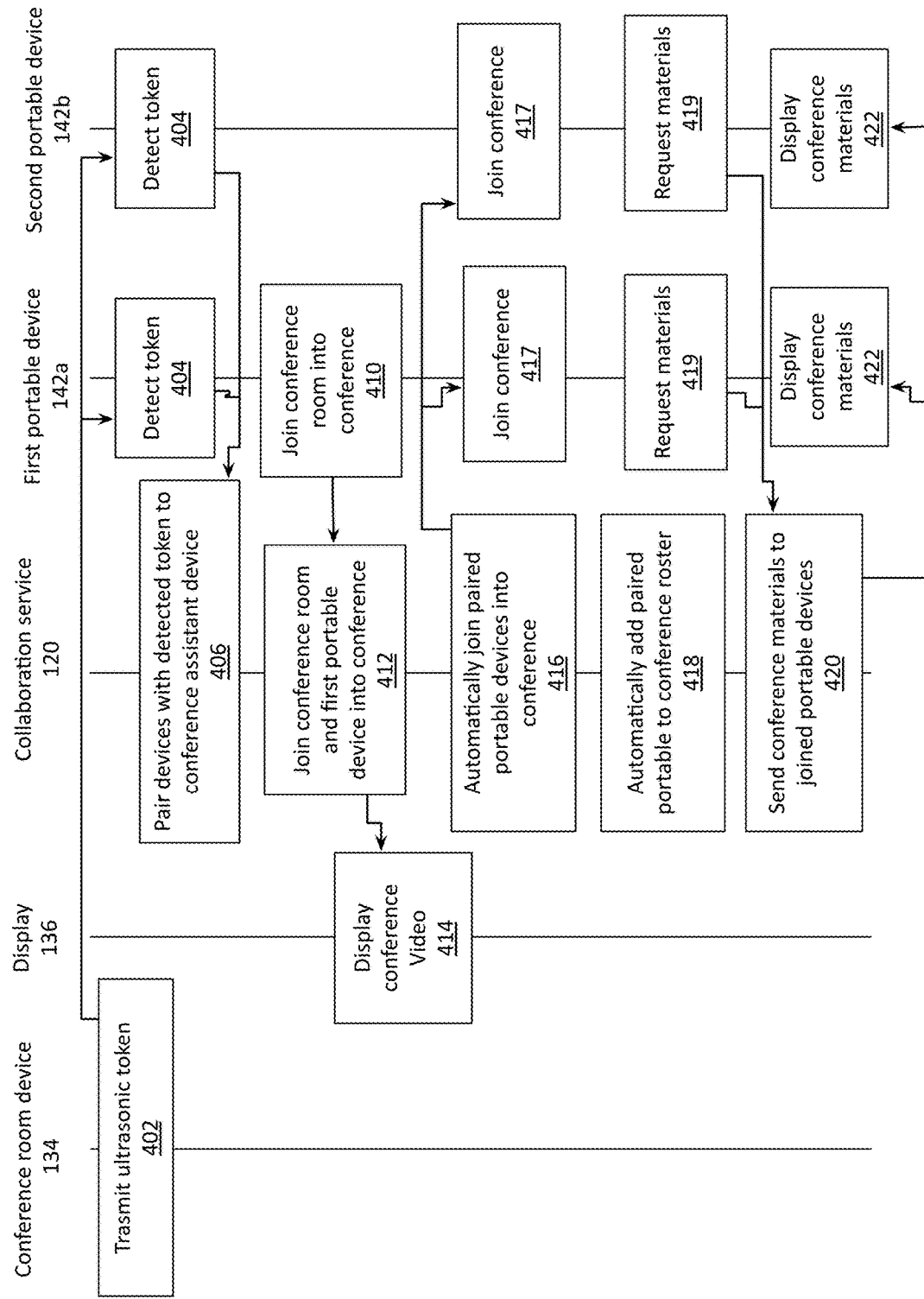

FIG. 3B illustrates another example method for automatically joining conference participants into a conference. FIG. 3B is similar in many respects to FIG. 3A except that instead of joining conference room 130 into the conference using conference room device 134, first portable device 142A is used to join conference room 130 into conference. Just as in FIG. 3A conference room device 134 can transmit (402) an ultrasonic token, which can be detected (404) by first portable device 142A and second portable device 142B.

First portable device 142A can then transmit detected token to pairing service 210 and request to be paired with conference room device 134 Pairing service 210 can pair (406) first portable device to conference room device 134. Once paired, first portable device 142A can use conference application 122 two join (410) itself and conference room 130 into the conference through communication with conferencing service 230. Conferencing service 230 of collaboration service 120 can join (412) conference room 130 and first portable device 142A into the conference, and display (414) conference video on display 136.

Before, after, or concurrently with first portable device 142A pairing with conference room device 134, second portable device 142B can itself detect (404) ultrasonic token and communicate with pairing service 210 to request to be paired to conference room device 134, and pairing service 210 can pair second portable device 142B with conference room device 134. Once paired collaboration service 120 can automatically join (416) paired portable device 142B into the conference.

In both FIG. 3A and FIG. 3B once the conference has begun in a conference room and a portable device has paired with conference room device 134 in the conference room 130 portable devices 142 automatically join to the conference without any interaction from operators of portable devices 142. In some embodiments, the automatically joining portable devices to the conference can occur at any time during the conference. Thus, a conference attendee joining the conference late will be automatically joined into the conference as soon as the attendee's device completes pairing with the conference room device.

FIG. 6 illustrates an example conference roster 602 presented on portable devices 142. Conference roster 602 can be organized by conference location. For example 604 represents conference participants in a conference room in San Francisco. As illustrated there are three conference participants in the same conference room in San Francisco, and each has a common mute/un-mute status since they are all in the same conference room together. 606 illustrates another conference room in New Jersey where one conference participant is located. 608 represents a remote conference participant. This participant is not located in any conference room associated with the conference. This participant may be anywhere that portable device 145 can receive a network connection. This includes the possibility that the participant is in a conference room that is either not equipped with necessary conferencing equipment or is not being utilized.

Participants can be organized by conference room because pairing service 210 of collaboration service 120 is aware of all portable devices 142 that have paired with conference room device 134 in conference room 130.

The conference roster 602 is useful to overcome a common problem associated with videoconferences, wherein participants outside of a large conference room are often unaware of who might be participating in the conference within the large conference room. While conferencing service 230 may transmit video of the large conference room to other conference rooms or remote portable devices 145, is often difficult to make out all conference participants in the video feed and often some participants can be off-camera. In addition, remote participants may not be able to visually recognize everyone since they don't know everyone. Thus the present technology solves this problem by automatically adding all conference participants to the conference roster and organizing the roster by conference room so that conference participants outside the conference room can know the full list of attendees.

Figure 7:
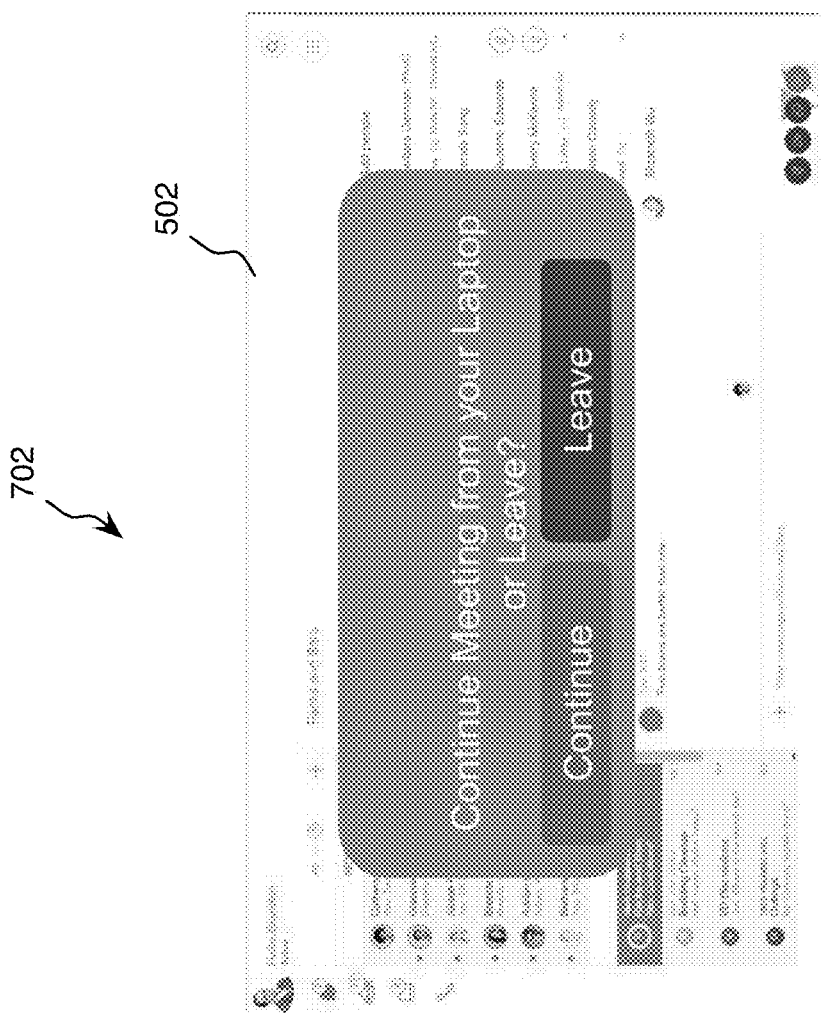
FIG. 7 illustrates an example prompt of a collaboration application according to some embodiments.

In some embodiments a conference participant that is in conference room 130 may leave with their portable device 142 before the conference is over. In such embodiments, portable device 142 will no longer detect an ultrasonic signal from conference room device 134, and will determine that portable device 142 is no longer in conference room 130. In response to such termination, collaboration application 122 can prompt the conference participant to answer whether they would like to continue the conference from portable device 142. For example, FIG. 7 illustrates screen display 502 displaying prompt 702 asking the user to selected whether or not they would like to continue the conference on their laptop. If the conference participant chooses the option that they would like to continue the conference from their portable device 142 portable device 142 can request a full conference stream from conferencing service 230 (which includes conference audio). As the user continues participation in the conference from outside conference room 130, portable device 142 can present all conference features including video and audio which were previously provided by conference room device 134 and display 136.

While the embodiments addressed above have focused on a use case wherein portable devices 142 are associated with identities that have been invited to the conference, in some embodiments the present technology can also handle uninvited identities. In such embodiments, when collaboration service determines that a device has paired with pairing service 210 that is associated with an identity that does not appear on a conference invite for the conference and/or is not a member of a collaborative space associated with the conference, collaboration service 120 will not automatically join the portable device associated with uninvited identity into the conference. Instead collaboration service 120 can instruct collaboration application 122 to present a message asking if the user would like to request to join the conference. If the user responds that they would like to join the conference, collaboration service can prompt the conference host to admit the user into the conference.

Figure 8:
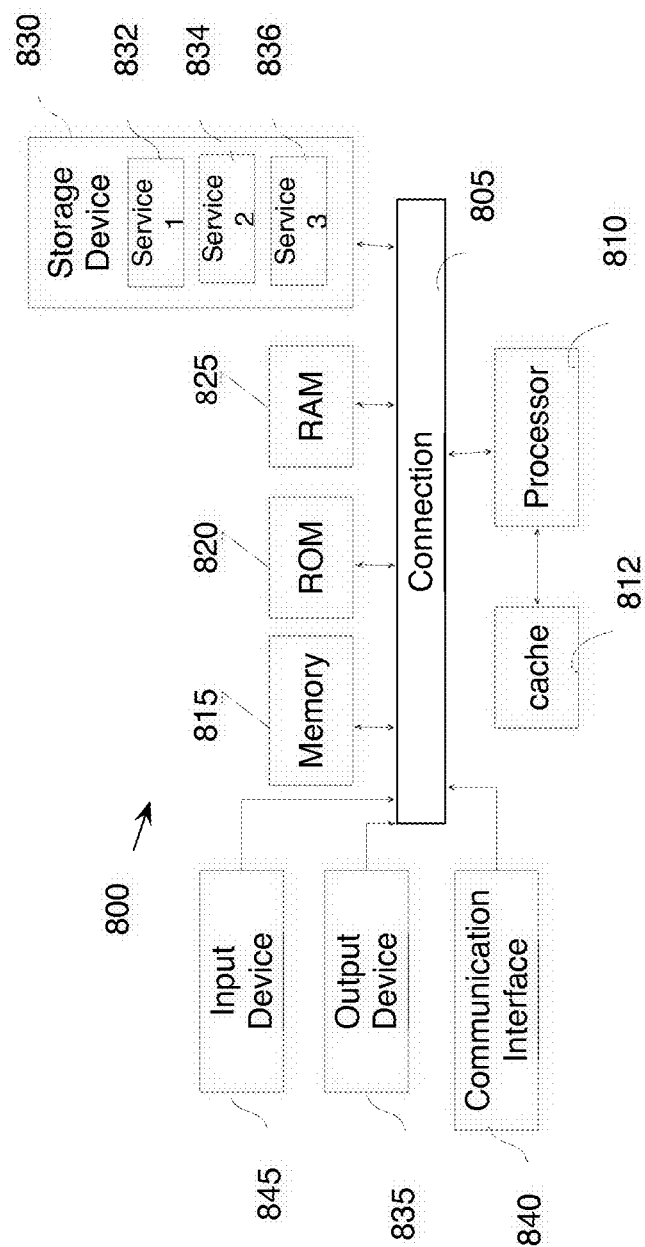
FIG. 8 illustrates an example possible system embodiment.

FIG. 8 shows an example of computing system 800 in which the components of the system are in communication with each other using connection 805. Connection 805 can be a physical connection via a bus, or a direct connection into processor 810, such as in a chipset architecture. Connection 508 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, at a collaboration service, information regarding a first identity from a first device present in a conference room, and information regarding a second identity from a second device present in the conference room;
receiving a request to initiate a conference in the conference room from the first device;
determining that the first identity and the second identity are both supposed to be in the conference; and
automatically joining the second device to the conference without sending audio to the second device based on the determining that the first identity and the second identity are both supposed to be in the conference, the second device joined to the conference without any action taken using the second device to join the conference, the second device joined to the conference without sending the audio to the second device to avoid a feedback loop with audio equipment in the conference room.

2. The computer-implemented method of claim 1, wherein the second device is joined to the conference upon learning that the first device is in the conference.

3. The computer-implemented method of claim 1, wherein the second device is paired with a conference room device.

4. The computer-implemented method of claim 1, wherein the first device is a conference room device.

5. The computer-implemented method of claim 1, wherein the first device is a portable computing device associated with a conference participant.

6. The computer-implemented method of claim 1, wherein the request to initiate the conference occurs prior to the receiving of the information from the second device present in the conference room.

7. The computer-implemented method of claim 3, comprising:
determining that the second device is no longer paired with the conference room device; and
presenting a prompt on the second device that is no longer paired with the conference room device, the prompt asking whether the conference should be continued or ended for the second device.

8. The computer-implemented method of claim 2, comprising:
sending by the collaboration service to each of the first device and the second device a conference roster, the conference roster including information describing that the first and second devices are in a same location.

9. The computer-implemented method of claim 1, comprising:
sending, by the collaboration service to each of the first device and the second device, conference materials being presented in the conference.

10. The computer-implemented method of claim 1, comprising:
sending, by the collaboration service to a display in the conference room, at least one of video or audio of a speaker at a same time as sending conference materials being presented in the conference.

11. The computer-implemented method of claim 1, comprising:
presenting a prompt to the second device requesting confirmation that the second device should be joined to the conference.

12. A non-transitory computer readable medium comprising instructions stored thereon, the instructions effective to cause a computing system to:
determine that a client device is paired to a conference room device that is in a conference room;
receive information regarding a first identity and a client device identifier for the client device paired to the conference room device;
determine that the first identity is invited to a conference taking place in the conference room; and
automatically join the client device to the conference without sending audio to the client device if the first identity is invited to the conference taking place in the conference room, the client device joined to the conference without any action taken using the client device to join the conference, the client device joined to the conference without sending the audio to the client device to avoid a feedback loop with audio equipment in the conference room.

13. The non-transitory computer readable medium of claim 12, wherein the instructions are effective to cause the computing system to:
add to a conference roster of the conference the first identity from the client device that was automatically joined.

14. The non-transitory computer readable medium of claim 12, wherein the conference was initiated prior to receiving the information.

15. The non-transitory computer readable medium of claim 12, wherein the instructions are effective to cause the computing system to:
send conference materials being presented in the conference to the client device; and
at a same time as the sending the conference materials being presented in the conference, send video of a speaker to a display in the conference room.

16. A system comprising:
a pairing service to pair a client device to a conference room device in a conference room;
a conferencing service to receive information regarding a first identity associated with the client device paired to the conference room device; and
a scheduling service to determine that the first identity is invited to a conference taking place in the conference room,
wherein,
the conferencing service is configured to automatically join the client device to the conference room device without sending audio to the client device if the scheduling service determines that the first identity is invited to the conference taking place in the conference room,
the conferencing service is configured to automatically join the client device to the conference room device without any action taken using the client device to join the conference room device, and
the conferencing service is configured to automatically join the client device to the conference room device without sending audio to the client device to avoid a feedback loop with audio equipment in the conference room.

17. The system of claim 16, wherein the conferencing service is to add the first identity to a conference roster of the conference.

18. The system of claim 16,
wherein the pairing service is configured to determine that client device is no longer paired with the conference room device; and
wherein the conference service is configured to send a prompt to the client device asking whether the conference should be continued or ended for the client device if the client device is determined to no longer be paired with the conference room device.

19. The system of claim 16, wherein the conference service is to send conference materials being presented in the conference to the client device, and at a same time as the sending the conference materials being presented in the conference, send video of a speaker to a display in the conference room.

* * * * *